United States Patent [19]
Bitenc

[11] Patent Number: 6,051,962
[45] Date of Patent: Apr. 18, 2000

[54] OVERLOAD PROTECTION UNIT FOR READJUSTING SWITCHING ELEMENTS

[75] Inventor: Bostjan Bitenc, Germering, Germany

[73] Assignee: Siemens Aktiengesellschaft, Munich, Germany

[21] Appl. No.: 09/091,151

[22] PCT Filed: Nov. 19, 1996

[86] PCT No.: PCT/DE96/02204

§ 371 Date: Jun. 8, 1998

§ 102(e) Date: Jun. 8, 1998

[87] PCT Pub. No.: WO97/21158

PCT Pub. Date: Jun. 12, 1997

[30] Foreign Application Priority Data

Dec. 6, 1995 [DE] Germany ............... 195 45 553

[51] Int. Cl.⁷ ................................. G05F 1/577

[52] U.S. Cl. ........................... 323/280; 323/267

[58] Field of Search .................. 323/280, 273, 323/267, 268, 276

[56] References Cited

U.S. PATENT DOCUMENTS

| | | |
|---|---|---|
| 3,729,671 | 4/1973 | Jeffery et al. . |
| 4,423,369 | 12/1983 | Alaspa et al. ............. 323/303 |
| 4,841,249 | 6/1989 | Duerr et al. . |
| 5,534,768 | 7/1996 | Chavannes et al. . |
| 5,787,014 | 7/1998 | Hall et al. ................ 323/281 |

FOREIGN PATENT DOCUMENTS

| | | |
|---|---|---|
| 0 410 423 A2 | 1/1991 | European Pat. Off. . |
| 0 499024 A2 | 8/1992 | European Pat. Off. . |
| 27 16 500 | 10/1978 | Germany . |
| 3626088 A1 | 2/1988 | Germany . |
| WO 95/31761 | 11/1995 | WIPO . |

*Primary Examiner*—Adolf Deneke Berhane
*Attorney, Agent, or Firm*—Hill & Simpson

[57] ABSTRACT

Method for regulating a plurality of output voltages of a converter, of which a first output voltage controls the converter and further output voltages are kept constant by readjusting elements, it being the case that when a prescribed voltage difference across the readjusting element is exceeded, the converter is controlled by a control loop, proceeding from the respective readjusting element.

13 Claims, 5 Drawing Sheets

$UA_i$ : UNREGULATED OUTPUT VOLTAGE
$\overline{UA_i}$ : REGULATED OUTPUT VOLTAGE $\dfrac{U_{max}}{U_{min}}$ : SIGNAL LIMITED TO THE RANGE [U min, U max]

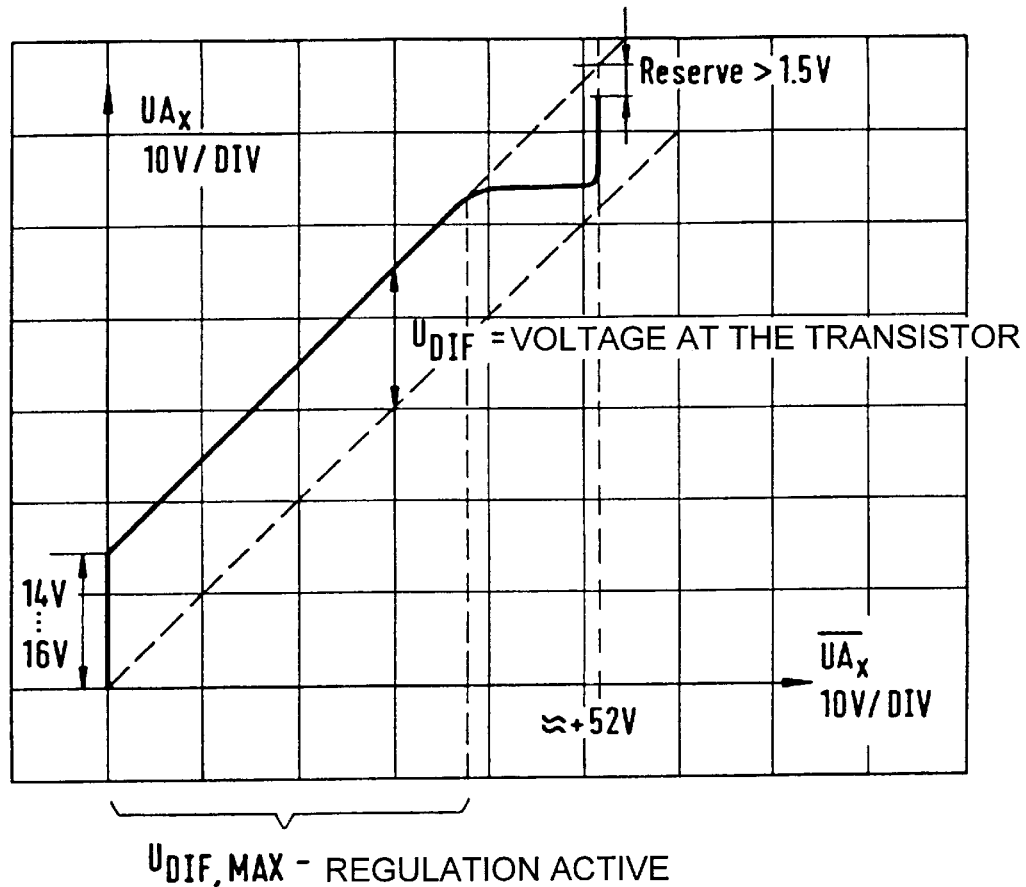

OVERLOAD PROTECTION UNIT FOR READJUSTING SWITCHING ELEMENTS

BACKGROUND OF THE INVENTION

1. Field of the Invention

The present invention relates generally to an electrical power supply having a plurality of outputs and more specifically to an overload protection circuit.

2. Description of the Related Art

Switched-mode power supplies having a plurality of output voltages are often implemented by means of transformers which contain a plurality of output windings. Since in the case of this principle only one output voltage can be regulated directly via the converter, the remaining outputs have to be regulated indirectly. For this purpose, linear readjusters are used which bring the unregulated voltage $UA_X$ of an output winding to the desired value $\overline{UA_X}$. This principle is represented in FIG. 1.

In general, the readjusting circuit contains a current limiter which, in the event of a fault, such as in the event of a short circuit, protects the connected load and the readjuster itself. In most applications, a virtually vertical current limiting characteristic curve is desired. A profile of such a current limiting characteristic curve is represented in FIG. 1a. The associated power loss $P_v$, which is converted at the linear regulator as a function of the load current, is represented in a second characteristic curve $I_{load}/P_V$ in FIG. 1b. For the purpose of simplification, for this representation the unregulated output voltage $UA_X$ is assumed as a constant $U_0$.

As can be seen from the course of the characteristic curve, the power loss rises sharply in current-limiting operation. A series transistor, which is integrated in the linear regulator, must therefore be protected against overheating, that is to say thermal destruction.

In order to avoid the overheating of the series transistor, an over-dimensioned heat sink has previously been used or a switching-off of the circuit arrangement in the case of overload has been obtained.

If the maximum power loss occurring $P_{max}=U_0\times I_{KS}$ is sufficiently small, this can easily be dissipated by means of a somewhat over-dimensioned heat sink. The series transistor, which converts the power loss into heat, can thus be protected effectively.

For the case in which $P_{max}$ is relatively large, the simple solution using the over-dimensioned heat sink is no longer tolerable, since this approach would lead to a large-volume and expensive heat sink.

Using a temperature sensor (for example an NTC or bimetallic switch), the temperature of the transistor can be monitored. If the temperature exceeds a limiting value, the readjusting circuit is switched off until it has cooled down once more to a sufficient extent. This procedure is repeated until the cause of the overheating, which can be a short circuit in the load circuit, for example, has been eliminated.

One significant disadvantage of this protection circuit is that a sensor has to be thermally coupled to the transistor which is to be protected in the readjusting circuit, that is to say the two components must be mounted close alongside each other on a heat sink. Since the mounting cannot be carried out in an automated fashion, this solution is relatively expensive and, in addition, requires space on the heat sink.

A method which is often used to protect the transistor arranged in the readjusting circuit from overload is to make the desired value of the current regulation dependent on the output voltage. The advantage of this principle is that the short-circuit current is considerably smaller than the current at which the limiting sets in. Since at a relatively small output voltage, that is to say a relatively large voltage across the transistor, the current is reduced, the power loss is considerably smaller than in the case of irreversible current limiting. However, this method is associated with the disadvantage that it cannot be employed in an unrestricted manner.

In the case of loads which need a constant current, such as for example remotely-fed telephones, it may be that the output voltage cannot "run up". This effect occurs when at the beginning of running up ($UA_X=0$), the connected loads require a higher load current than the short-circuit current. Since this does not permit a reversible characteristic curve, the loads attempt to establish the desired current by lowering their load impedance. The result is that the loads pass into the short-circuit current range, and the readjuster never leaves the short-circuit point.

SUMMARY OF THE INVENTION

The present invention is based on the object of providing a simple protection circuit whilst avoiding the disadvantages listed above.

The achievement of this and other objects and advantages is apparent from a method of regulating a plurality of output voltages of a converter, of which a first output voltage controls the converter via a first control signal and at least one further output voltage is kept constant by a readjusting element, wherein, if a prescribed voltage across the readjusting element is exceeded, a second control signal is generated and passed on to a decoupling arrangement via a regulating element, in addition, the control signal formed from the first output voltage is present across the decoupling arrangement and a control signal is passed on to the converter via the decoupling arrangement.

In addition to the advantage that the circuit arrangement manages without an over-dimensioning of a heat sink, the invention is distinguished by a further advantage that the expenditure in terms of circuitry for the protection circuit is low.

BRIEF DESCRIPTION OF THE DRAWINGS

Further special features of the invention become evident from the following more detailed explanations relating to the drawings, in which:

FIG. 4 is a graph which shows a characteristic curve of a regulated output voltage.

DETAILED DESCRIPTION OF THE PREFERRED EMBODIMENTS.

Figure 1:
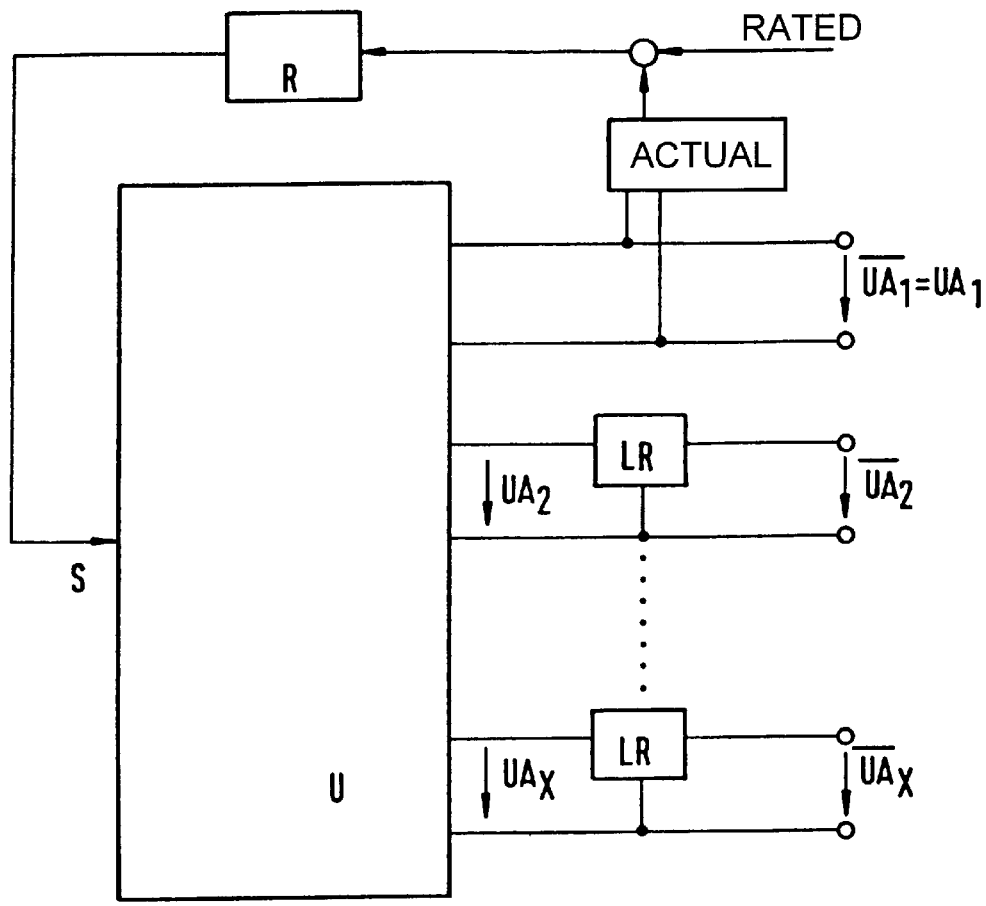
FIG. 1 is a block circuit diagram which shows a known circuit arrangement of a converter having a plurality of output voltages.
Figure 1A:
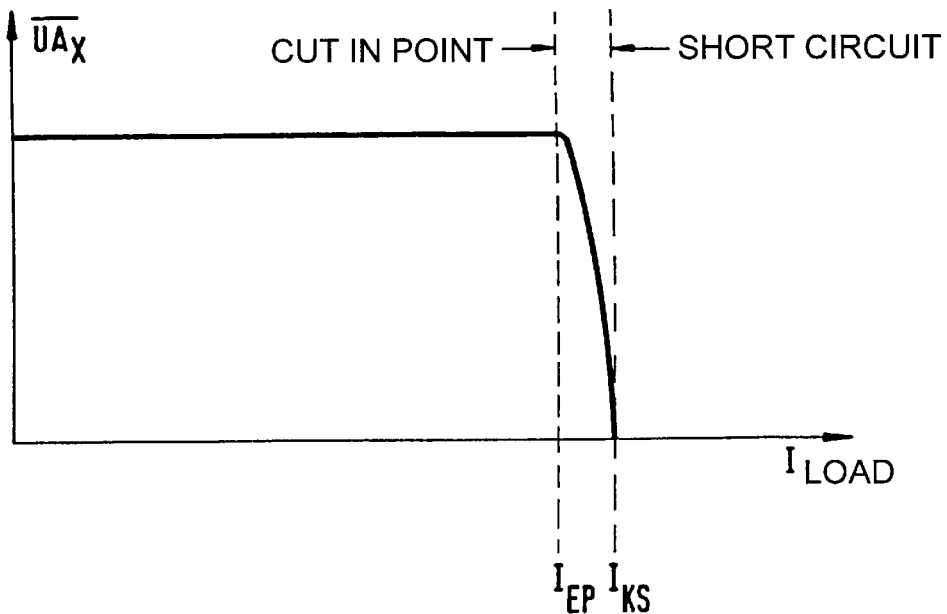
FIG. 1a is a graph which shows a current/voltage characteristic curve.
Figure 1B:
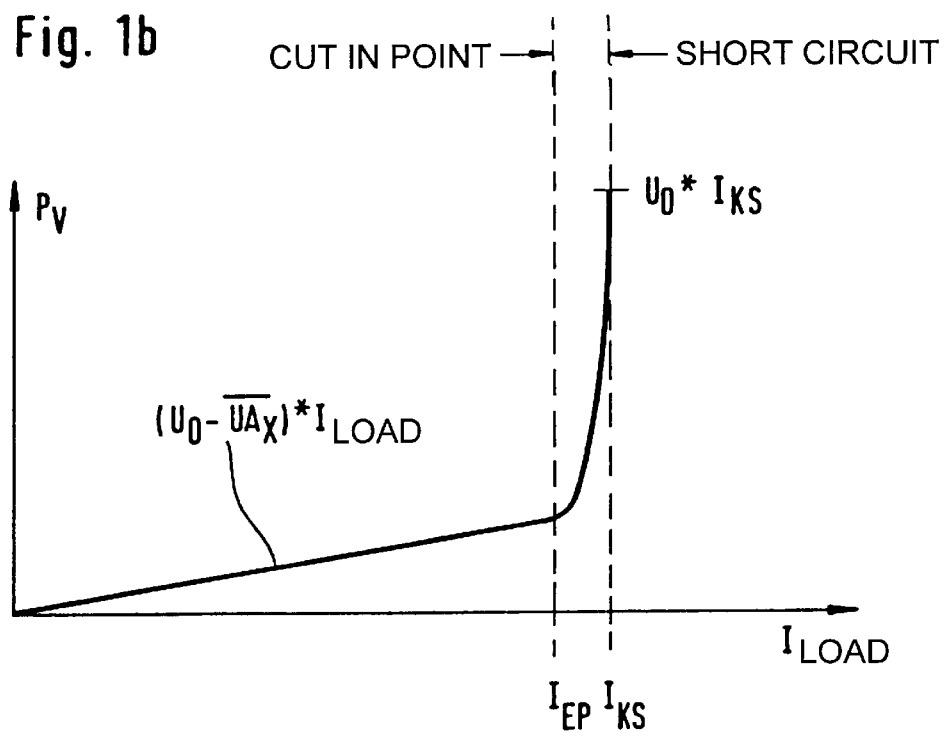
FIG. 1b is a graph which shows a current/power characteristic curve.
Figure 2:
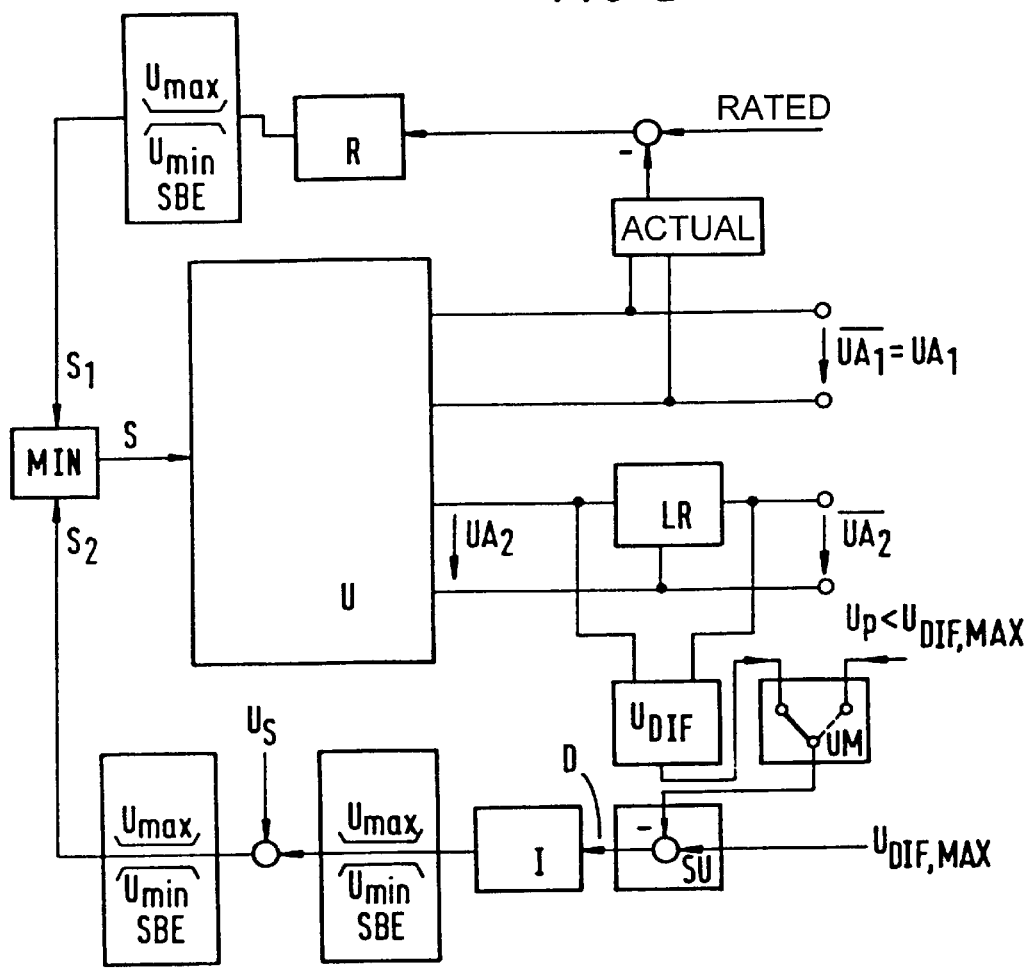
FIG. 2 is a basic block diagram of an overload protection circuit according to the invention.
Figure 2:
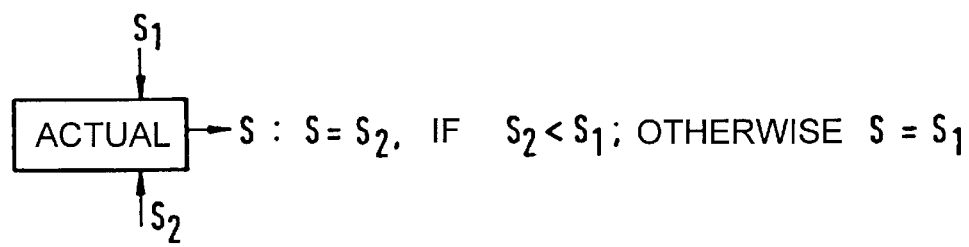

In the case of the circuit principle according to the invention, use is made of the fact that the input voltage $UA_X$ for the readjuster LR is not fixed but can be influenced. With the aid of a third control loop (see FIG. 2), which intervenes in the regulation of the directly regulated output voltage, the voltage across the series transistor of a readjuster LR, in particular of a linear readjuster, can thus be limited, as required, to a prescribed value $U_{DIF, MAX}$. This principle is represented in FIG. 2.

The additional control loop can take over the monitoring of the converter U via a control signal $S_2$. In normal operation, $U_{DIF}$ is smaller than $U_{DIF, MAX}$. An integrated positive control deviation D leads to the control signal $S_2$ finding itself at the upper stop $U_{max}$ of the control voltage and hence cannot intervene in the regulation of the directly regulated loop. In this case, the converter U is controlled by the control signal $S_1$ derived directly from a first output voltage $UA_1$.

However, if the voltage across the linear regulator LR exceeds $U_{DIF, MAX}$, the negative control deviation D leads to the output signal of an integrator I becoming smaller. If the voltage value of the control signal $S_2$ falls below the voltage value of the control signal $S_1$, the $U_{DIF}$ regulator takes over the monitoring of the converter U ($S=S_2$). From this time forward, the voltage across the readjusting transistor of the linear regulator LR also begins to sink to the maximum value $U_{DIF, MAX}$.

Since the transistor in the readjusting element $LR_n$ does not suffer any damage in the case of increased losses for a short time, with the aid of $U_{threshold}$ ($U_s$) and the integration time constants $IT_I$ of the integrator I, it is possible to set a power E which may be additionally converted for a short time in the transistor of the readjusting element $LR_n$. Depending on the setting of a working point of the directly regulated loop (voltage value of $S_1$), the power E to be used lies between the limits $E_{MIN}$ and $E_{MAX}$. These are defined as follows:

$$E_{MIN}=T_I*U_{threshold}*I_{current\ limiting}$$

$$E_{MAX}=T_I*(U_{threshold}+U_{Max}-U_{Min})*I_{current\ limiting}$$

Allowing increased losses for a short time across the transistor of the readjusting circuit of $LR_n$ is associated on the one hand with the advantage that the control loop does not respond in the case of the smallest disturbances and, on the other hand, it enables unimpeded "running up" of the directly regulated loop.

Figure 3:
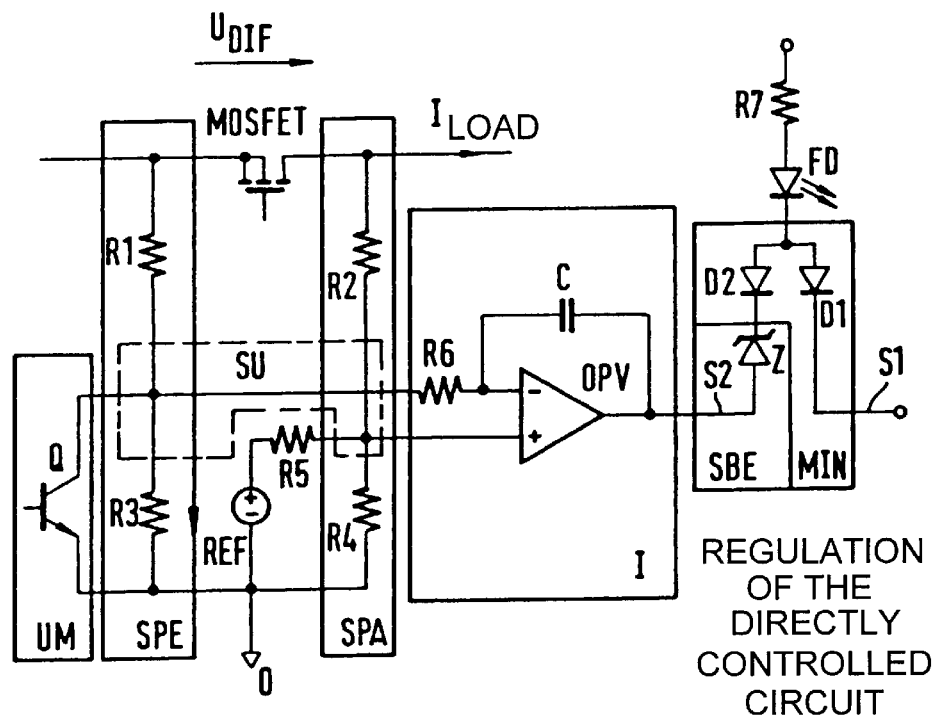
FIG. 3 is a circuit diagram which shows a circuit configuration of an overload protection circuit.

The realization of the overload protection in terms of circuitry is represented in FIG. 3. The resistors R1 to R5 coupled to the operational amplifier OPV generate the formation of a difference and a comparison with a desired value $V_{REF}$. The integration time constant $IT_1$ of the integrator I may be set by means of the resistors R1, R3 and, R6 and the capacitor C. The threshold voltage $U_{threshold}$ is realized by means of two decoupling diodes $D_1$ and $D_2$, with the aid of the zener diode Z and the selection of a level MIN. In the circuit arrangement shown, the control of the converter U is carried out by an optocoupler, a transmitting diode FD and a bias resistor R7 being represented for this purpose. Using the transistor Q, the divider SPE can be detuned and a sufficiently small voltage $U_{DIF}(<U_{DIF, MAX})$ can be simulated for the voltage $U_{DIF, MAX}$ regulation. The $U_{DIF, MAX}$ regulation can thus be switched inactive. This can be necessary if the voltage $U_{DIF}$ across the readjuster also exceeds the value $U_{DIF, MAX}$ in the case of a low load (small output current).

An experimental check of the overload protection circuit was carried out, by way of example, on a power supply subassembly which supplies the output voltages −54 V and +52 V. The −54 V output is directly regulated and the +52 V outputs readjusted. The result is summarized in the diagram in FIG. 4.

Represented on the vertical axis is the input voltage UAX of the readjusting element $LR_n$, the output voltage $UA_X$ of the readjusted loop being plotted on the horizontal axis. The distance between the measured curve and the 1:1 straight line drawn in is, in this case, the voltage $U_{DIF}$ across the transistor of the readjusting element LR. The measured voltage in the marked region, that is to say the voltage across the transistor, never becomes greater than a preset value (in the experiment about 15 V).

The most significant features of the readjusting circuit can be summarized as follows:

No realization in terms of circuitry of a reversible characteristic curve of a current limiter is necessary.

Together with a vertical current limiting characteristic curve, the power is limited to $P_{MAX}=U_{DIF,MAX}*I_{current\ limiting}$.

The directly regulated loop is "driven down" only to the extent necessary. The protection for a readjusting circuit $LR_n$ only acts if the power loss $P_{MAX}$ is exceeded.

Via the threshold voltage $U_s$ and the integration constant $IT_1$, it is possible to set the power loss E which may be additionally converted for a short time.

Although other modifications and changes may be suggested by those skilled in the art, it is the intention of the inventors to embody within the patent warranted hereon all changes and modifications as reasonably and properly come within the scope of their contribution to the art.

I claim:

1. A method of regulating a plurality of output voltages of a converter, comprising the steps of:

controlling the converter by a first output voltage via a first control signal;

keeping constant at least one further output voltage by a readjusting element;

generating a second control signal if a predetermined voltage across the readjusting element is exceeded;

passing the second control signal on to a decoupling arrangement via a regulating element;

providing the first control signal across the decoupling arrangement; and passing one of said first and second control signals on to the converter via the decoupling arrangement.

2. A method according to claim 1, wherein said readjusting element operates in voltage regulating operation.

3. A method according to claim 2, further comprising the steps of:

if the predetermined voltage potential across the readjusting element is exceeded, the voltage potential is provided with a negative sign and passed on to a summing circuit;

applying a maximum permissible voltage difference across the readjusting element to a further input of the summing circuit; and passing a sum signal on to a circuit input of a regulating element.

4. A method according to claim 3, further comprising the step of:

under low load in the voltage regulating operation of the readjusting element, passing an auxiliary voltage on to the summing circuit, said auxiliary voltage being slightly smaller than the maximum permissible voltage difference across the readjusting element.

5. A method according to claim 1, further comprising the step of:

passing on only one of the first and second control signals by the decoupling arrangement to the converter.

6. A method according to claim 1, further comprising the step of:

limiting voltage values of the control signals at an input of the decoupling arrangement are in each case within a predetermined value range.

7. A method according to claim 1, further comprising the step of:

using an integrator as said regulating element.

8. A method according to claim 1, wherein said readjusting element operates in current regulating operation.

9. A method as claimed in claim 1, wherein said first control signal is obtained in a first control loop and said second control signal is obtained in a second control loop.

10. A method as claimed in claim 1, further comprising the step of:

setting a permitted short term power which may be converted using an integration time constant and a threshold value.

11. A circuit arrangement for limiting power loss in a readjusting element, comprising:

a first voltage divider is arranged at an input and a second voltage divider arranged at an output of the readjusting element;

an operational amplifier as an integrator and connected to taps of the first and second voltage dividers;

a resistor connected between a first input of the operational amplifier and a reference potential;

a transistor having a collector connected to a second input of the operational amplifier and to the tap of the first voltage divider; and a converter having an input connected to an output of said operational amplifier for receiving one of first and second control signals.

12. A circuit arrangement according to claim 8, further comprising:

a decoupling arrangement formed from first and second diodes, the first and second control signals being present on cathodes of the diodes; and an optocoupler having a photodiode with a cathode connected to a line connecting anodes of the diodes.

13. A circuit arrangement according to claim 11, further comprising:

an optocoupler between an output of the decoupling unit and an input of the converter.

\* \* \* \* \*